US011282122B1

United States Patent
Lang (10) Patent No.: US 11,282,122 B1
(45) Date of Patent: Mar. 22, 2022

(54) EVALUATION AND COMPARISON OF VENDORS ACCORDING TO STRUCTURED CAPABILITY MODELS

(71) Applicant: MY Mavens LLC, New York, NY (US)

(72) Inventor: Simon Garrett Lang, Mahwah, NJ (US)

(73) Assignee: MY MAVENS LLC, New York, NY (US)

(*) Notice: Subject to any disclaimer, the term of this patent is extended or adjusted under 35 U.S.C. 154(b) by 78 days.

(21) Appl. No.: 16/274,678

(22) Filed: Feb. 13, 2019

Related U.S. Application Data (62) Division of application No. 15/012,349, filed on Feb. 1, 2016, now abandoned.

(60) Provisional application No. 62/110,253, filed on Jan. 30, 2015.

(51) Int. Cl.
  *G06Q 30/00* (2012.01)
  *G06Q 30/06* (2012.01)

(52) U.S. Cl.
  CPC ................ *G06Q 30/0629* (2013.01)

(58) Field of Classification Search
  CPC ............ G06Q 30/00; G06Q 30/0601; G06Q 30/0641; G06Q 30/0643
  See application file for complete search history.

(56) References Cited

U.S. PATENT DOCUMENTS

| | | | | |
|---|---|---|---|---|
| 5,319,542 A * | 6/1994 | King, Jr | ............... | G06Q 10/087 705/26.61 |
| 7,113,917 B2 | 9/2006 | Jacobi et al. | | |
| 7,433,832 B1 * | 10/2008 | Bezos | ............... | G06Q 10/10 705/26.8 |
| 7,778,890 B1 * | 8/2010 | Bezos | ............... | G06Q 30/0633 705/26.1 |
| 8,370,203 B2 * | 2/2013 | Dicker | ............... | G06Q 30/0631 705/14.53 |

(Continued)

OTHER PUBLICATIONS

Abdool, Hannah, Akash Pooransingh, and Ying Li. "Recommend My Dish: A multi-sensory food recommender." 2015 IEEE Pacific Rim conference on communications, computers and signal processing (PACRIM). IEEE, 2015. (Year: 2015).*

(Continued)

*Primary Examiner* — Christopher B Seibert
(74) *Attorney, Agent, or Firm* — Armstrong Teasdale LLP (57) ABSTRACT

Systems and methods can support tree-based comparisons within a vendor comparison system. A vendor category may be established. Vendors associated with the vendor category may be identified. Capabilities associated with the vendor category may be specified. A capability tree structure may be established representing the relationships within the received capabilities according to a hierarchical structure. Indicators of one or more of the capabilities may be received for one or more of the vendors. The received indicators may be aggregated and organized according to the hierarchical structure associated with the capability tree. The capability tree may be defined and/or refined by the users. Comparison queries comprising indications of a subset of the capability tree for comparison may be received and evaluated. Evaluation results may be provided according to the aggregated indicators within the specified subset of the capability tree.

19 Claims, 4 Drawing Sheets

(56) References Cited

U.S. PATENT DOCUMENTS

| | | | |
|---|---|---|---|
| 2001/0037258 A1* | 11/2001 | Barritz | G06Q 30/0641 |
| | | | 705/27.1 |
| 2001/0037261 A1* | 11/2001 | Ishitsuka | G06Q 30/06 |
| | | | 705/26.81 |
| 2003/0177072 A1* | 9/2003 | Bared | G06Q 30/0635 |
| | | | 705/26.81 |
| 2003/0233425 A1* | 12/2003 | Lyons | H04L 29/12009 |
| | | | 709/217 |
| 2004/0133542 A1* | 7/2004 | Doerksen | G06F 40/174 |
| 2005/0216304 A1* | 9/2005 | Westphal | G06Q 30/0601 |
| | | | 705/26.1 |
| 2005/0289039 A1* | 12/2005 | Greak | G06Q 30/0609 |
| | | | 705/37 |
| 2007/0276721 A1* | 11/2007 | Jackson | G06Q 30/0253 |
| | | | 705/14.51 |
| 2007/0282693 A1* | 12/2007 | Staib | G06Q 30/0621 |
| | | | 705/26.5 |
| 2008/0071640 A1* | 3/2008 | Nguyen | G06Q 30/0226 |
| | | | 705/14.27 |
| 2008/0275792 A1* | 11/2008 | Wise | G06Q 30/0601 |
| | | | 705/22 |
| 2009/0292584 A1* | 11/2009 | Dalal | G06Q 30/02 |
| | | | 705/7.29 |
| 2010/0003647 A1 | 1/2010 | Brown et al. | |
| 2010/0083217 A1* | 4/2010 | Dalal | G06F 3/0482 |
| | | | 717/106 |
| 2010/0191582 A1* | 7/2010 | Dicker | G06Q 30/0633 |
| | | | 705/14.51 |
| 2011/0029364 A1 | 2/2011 | Roeding et al. | |
| 2011/0040649 A1* | 2/2011 | Dooley | G06Q 30/0641 |
| | | | 705/26.5 |
| 2011/0040655 A1* | 2/2011 | Hendrickson | G06Q 30/0619 |
| | | | 705/27.1 |
| 2011/0087530 A1 | 4/2011 | Fordyce et al. | |
| 2011/0125569 A1* | 5/2011 | Yoshimura | G06Q 30/06 |
| | | | 705/14.36 |
| 2011/0208617 A1* | 8/2011 | Weiland | G06Q 30/0641 |
| | | | 705/27.1 |
| 2012/0166964 A1* | 6/2012 | Tseng | G06F 3/048 |
| | | | 715/745 |
| 2012/0290448 A1* | 11/2012 | England | G06Q 30/0282 |
| | | | 705/27.2 |
| 2012/0296762 A1* | 11/2012 | Gindlesperger | G06Q 40/04 |
| | | | 705/26.3 |
| 2013/0006788 A1* | 1/2013 | Zhou | G06Q 30/02 |
| | | | 705/26.1 |
| 2013/0041781 A1* | 2/2013 | Freydberg | G06Q 30/06 |
| | | | 705/27.1 |
| 2013/0211968 A1* | 8/2013 | Patro | G06Q 30/06 |
| | | | 705/27.1 |
| 2013/0262193 A1* | 10/2013 | Sundaresan | G06Q 10/10 |
| | | | 705/12 |
| 2013/0268377 A1* | 10/2013 | Jessup | G06Q 50/01 |
| | | | 705/14.73 |
| 2013/0311315 A1* | 11/2013 | Zises | G06Q 30/0605 |
| | | | 705/26.2 |
| 2014/0006182 A1* | 1/2014 | Wilson | G06Q 30/0635 |
| | | | 705/15 |
| 2016/0248860 A1* | 8/2016 | Dunbar | H04L 67/146 |

OTHER PUBLICATIONS

International Search Report and Written Opinion issued for PCT/US2018/57171, dated Feb. 26, 2019, 10 pp.

* cited by examiner

EVALUATION AND COMPARISON OF VENDORS ACCORDING TO STRUCTURED CAPABILITY MODELS

CROSS-REFERENCE TO RELATED APPLICATIONS

The present application is a divisional of U.S. utility patent application Ser. No. 15/012,349, titled "EVALUATION AND COMPARISON OF VENDORS ACCORDING TO STRUCTURED CAPABILITY MODELS," filed Feb. 1, 2016, which claims priority to U.S. provisional patent application 62/110,253, titled "Systems And Methods For Vendor Multi-Tenent Tree-Based Comparison Support," filed Jan. 30, 2015. Each of the above applications is incorporated by reference herein in its entirety.

BACKGROUND

Online reviews can allow current, or potential, customers of certain businesses or organizations to benefit from feedback provided by prior customers. Such reviews traditionally include extremely broad, freeform textual responses. Accordingly, collected reviews are traditionally complicated to search or compare in a rigorous and meaningful fashion. One reviewer may comment on how far a store is from their workplace while another reviewer may comment on the store's favorable pricing for one obscure item that the reader may not wish to base their store select upon.

Accordingly, there is a need in the art for technology supporting the creation and application of structured capability models for evaluating and comparing vendors in a broad range of business categories.

SUMMARY

In certain example embodiments described herein, methods and systems can support tree-based comparisons within a vendor comparison system. A vendor category may be established. Vendors associated with the vendor category may be identified. Capabilities associated with the vendor category may be specified. A capability tree structure may be established representing the relationships within the received capabilities according to a hierarchical structure. Indicators of one or more of the capabilities may be received for one or more of the vendors. The received indicators may be aggregated and organized according to the hierarchical structure associated with the capability tree. The capability tree may be defined and/or refined by the users. Comparison queries comprising indications of a subset of the capability tree for comparison may be received and evaluated. Evaluation results may be provided according to the aggregated indicators within the specified subset of the capability tree.

These and other aspects, objects, features, and advantages of the example embodiments will become apparent to those having ordinary skill in the art upon consideration of the following detailed description of illustrated example embodiments.

DETAILED DESCRIPTION

Overview

The technology presented herein can support a vendor multi-tenant tree-based comparison system. The vendor multi-tenant tree-based comparison system can support multiple simultaneous users. A set of options, such as capabilities or functionalities, may be represented in a tree structure and compared between two or more vendors providing those capabilities or functionalities. The tree structure may be created and updated by one or more users. The tree may have nodes and leaves that may be assembled into a logical, organized structure. The elements of the tree structure may be mutually exclusive and categorically exhaustive ("MECE"). The tree structure may describe capabilities or functionalities to be compared. A second dimension may contain vendors or providers for to which the capabilities or functionalities may be compared. For example, a tree structure may be labeled "seafood", with leaf nodes of "salmon" and "cod." The second dimension may contain one or more restaurants that sell dishes of "salmon" and "cod." The tree structure may point to one or more user ratings from consumers of salmon and/or cod at those restaurants. The contents of the intersection between a leaf/node and a second dimension object (such as a vendor in the previous example) can provide comparative information in the form of text descriptions, rankings, scores, values, calculated values, ranges, limits, or other content types. These contents may be entered into an input box (or other user interface structure) on a website or software application. These contents may be defined by a user.

The vendor tree-based comparison system can evolve based on the input and feedback of many users across many companies and industries. Certain users may extend the parameters to be compared for a given type of vendor. This is in contrast to traditional static sets of comparison parameters. The technology presented herein can support a structured, multi-user system where multiple users can access and update data. Accordingly, the data may be constantly improved upon. Users of the system may leverage the ever-improving data sets. Users can curate the versions of the data sets to present only the most refined, appropriate, or desirable version. Users designated as data stewards may determine these data sets or establish the criteria for doing so. A dynamic tree-structure may be compared rigorously across various options using user input and feedback.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
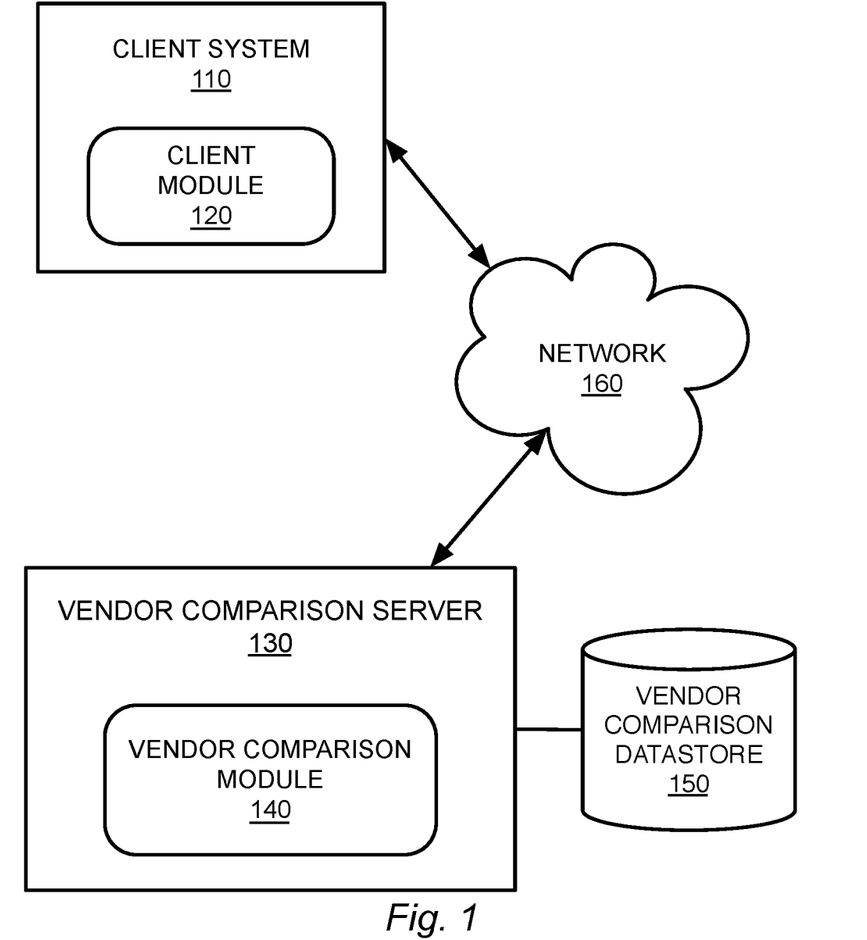
FIG. 1 is a block diagram depicting a tree-based vendor comparison system in accordance with one or more embodiments presented herein.

FIG. 1 is a block diagram depicting a tree-based vendor comparison system in accordance with one or more embodiments presented herein. The system may comprise one or more client systems 110 associated with a client module 120 for interfacing with a vendor comparison server 130 associated with a vendor comparison module 140. The vendor comparison server 130 may store or retrieve data to/from a vendor comparison datastore 150. The systems presented herein may all communicate over one or more networks 160.

The client system 110 may execute the client module 120. The client module 120 may comprise a computer application, a mobile application (such as those for tablets or smart phones), a web browser, or software/firmware associated with a kiosk, set-top box, or other embedded computing machine. Examples of categories for the users of the client system 110 may include unregistered users, contributors, mavens, managers, data stewards, or administrators. According to various embodiments, any users may perform searches within the system. Contributors may provide reviews or details of their experiences with the vendors. Mavens may have some level of expertise in a particular field of vendors and may extend the types of parameters being evaluated. Managers and administrators can oversee the operation of the vendor comparison system. Data stewards may maintain content and/or operations within the vendor comparison system. It should be appreciated that these examples categories of users may be collapsed together into fewer categories, they may overlap, or they may be broken into additional categories. It should be appreciated that these are merely non-limiting examples.

The vendor comparison server 130 may execute in conjunction with the vendor comparison module 140. The vendor comparison server 130 may provide the back-end functionality of the vendor multi-tenant tree-based comparison system. User operations associated with the vendor comparison server 130 may update data associated with the vendor comparison server 130 and the vendor comparison datastore 150. Changes may be frequent as data is updated and rewritten over time.

The vendor comparison datastore 150 may be comprised of one or more databases containing data input by contributors, mavens, managers, data stewards, administrators, other users, or various combinations thereof. Data from the vendor comparison datastore 150 may be written to, and retrieved by, the vendor comparison module 140.

Figure 4:
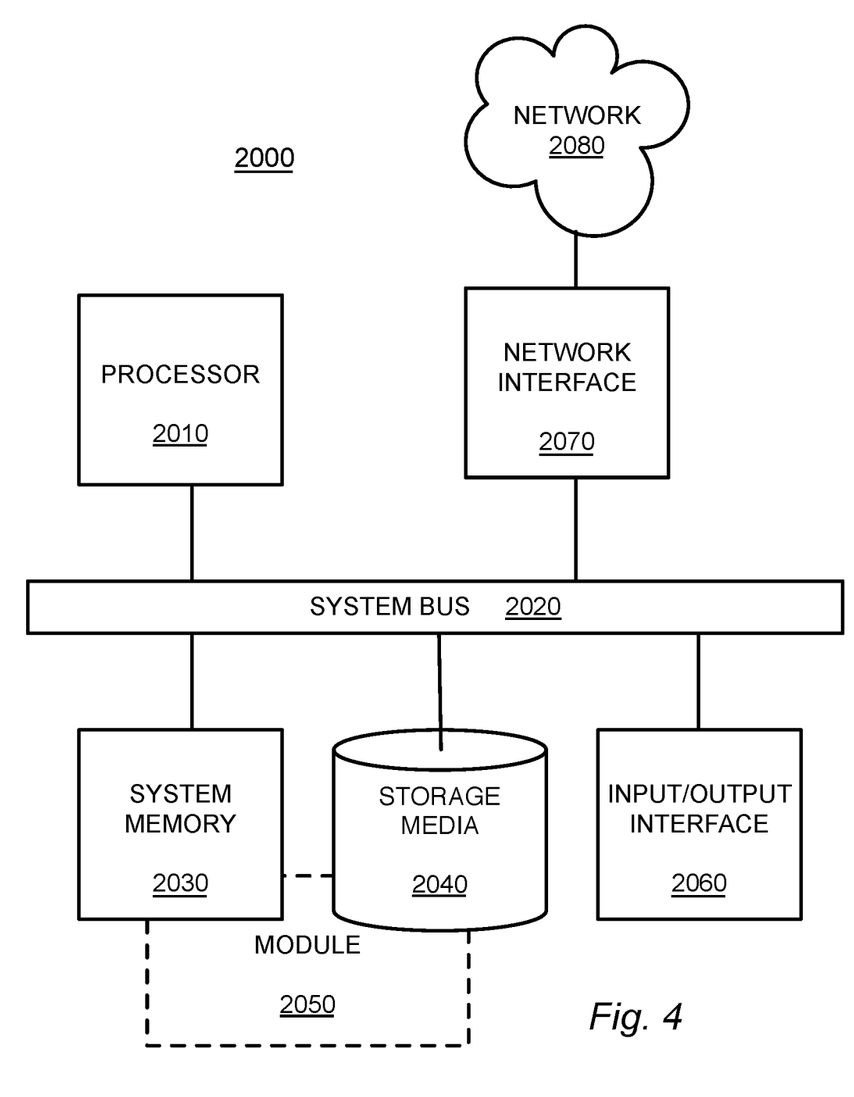
FIG. 4 is a block diagram depicting a computing machine and a module in accordance with one or more embodiments presented herein.

The client system 110, vendor comparison server 130, or any other systems associated with the technology presented herein may be any type of, or collection of, computing machine such as, but not limited to, those discussed in more detail with respect to FIG. 4. Furthermore, any modules (such as the client module 120 or the vendor comparison module 140) associated with any of these computing machines or any other modules (scripts, web content, software, firmware, or hardware) associated with the technology presented herein may by any of the modules discussed in more detail with respect to FIG. 4. The computing machines discussed herein may communicate with one another as well as other computer machines or communication systems over one or more networks such as network 160. The network 160 may include any type of data or communications network including any of the network technology discussed with respect to FIG. 4.

Figure 2:
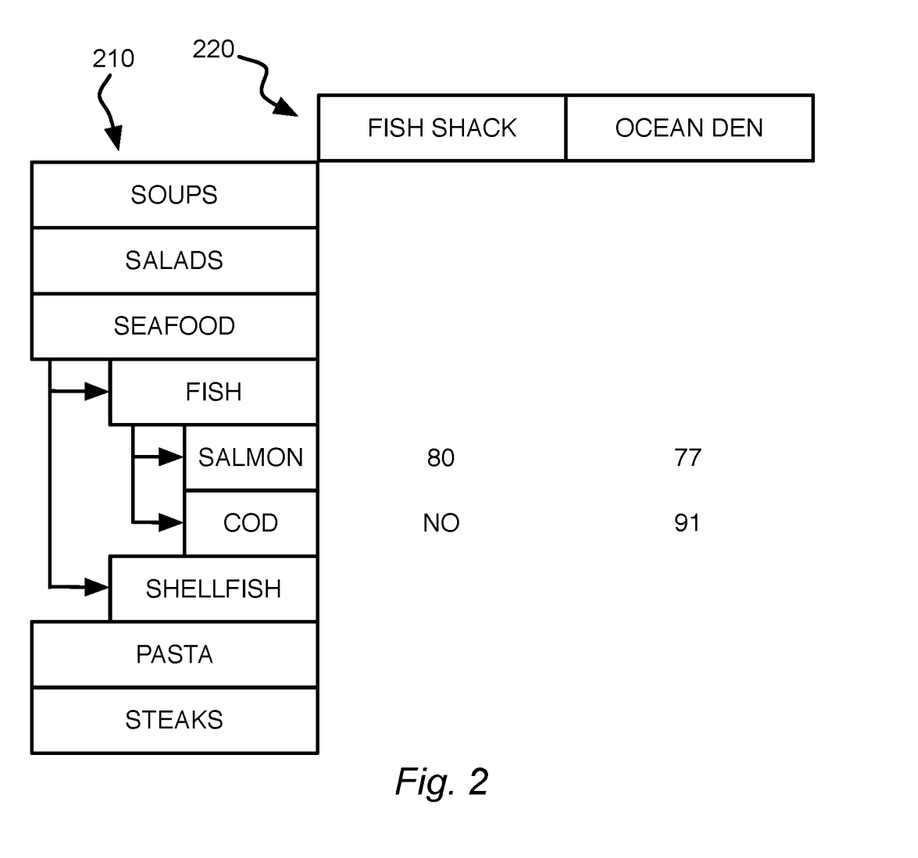
FIG. 2 is a user interface diagram depicting a tree-based vendor comparison interface in accordance with one or more embodiments presented herein.

FIG. 2 is a user interface diagram depicting a tree-based vendor comparison interface in accordance with one or more embodiments presented herein. The capability tree structure 210 may be populated with goods or services offered to one or more clients or customers. The vendors 220 are providers who offer the goods or services to the clients or customers.

The technology presented herein can assist users in comparing current and/or potential vendors 220 against specified requirements to see which vendors 220 meet their respective requirements most effectively. The capability tree structure 210 can be displayed by the client system 110 where contributors, mavens, managers, data stewards, administrators, or any other users may interface with the tree-based vendor comparison system. Upon initial access, the capability tree structure 210 may present a view of complete data trees. Upon later use, persistent state information, such as browser cookies, may be used to display content within the capability tree structure 210 that may be determined as most relevant based on prior sessions.

Ratings given to vendors 220 by various users may be associated with the capability tree structure 210. According to the illustrated example embodiment, sample ratings are shown in the "Seafood" section and in the "Fish" subsection. Considering "salmon" ratings, the vendor "Fish Shack" has received a score of 80, while vendor "Ocean Den" received a comparatively lower score of 77. Considering ratings for "cod," the vendor 220 "Fish Shack" has received a score of "NO" while vendor "Ocean Den" has received a score of 91. The "NO" indication may indicate that "Fish Shack" does not have a cod offering or that no reviews have been given for a cod offering.

According to certain other examples, a user may layout a tree structure of vendor attributes in a specific field. For example, if one were comparing a print vendor they might layout criteria like "Print Colors" with options of "Black and White," "Greyscale," and "Color." One may also have an option of "Additional Inserts." A user can add an option of "Glossy color inserts" as an option to be compared against. Then another user, such as a vendor, may specify which of these services they offer. The specification may also come from one who created the tree and he or she may enter it on behalf of the vendor. The vendor's ability to meet these criteria can then be rated by users who have experience working with these vendors. For example, a user may say that "ACME Printing" is able to print color, but the colors prints are of poor quality. Thus, ACME may have a lower rating for color printing capabilities.

The tree-based vendor comparison system may support finding solutions based on structured data. For example, when a user searches on a list of attributes, vendors 220 having those attributes and ideally having positive ratings around those attributes, may be presented in response. For example, if one wants to visit a restaurant that serves a cod dish as well as a steak dish, one can search for restaurants that have both dishes on their menu with high ratings for each.

Technology presented herein can leverage the contributions from multiple users in a structured way to create a continuously improving, repeatable process from improving what had traditionally been a one-off, manual process. Such a continuously improving process may leverage user input data. Optionally, the process may leverage stewarded, or curated, input data. The data may be organized into a tree-structure mirroring, or based upon the capability tree structure 210 to support comparisons across various categories.

The technology presented herein can be applied broadly across many industries, such as restaurants, car dealerships, electronics manufacturers, and so forth. Users may want to compare similar attributes across multiple entities. The tree-based vendor comparison system can support comparing the most important and critical attributes of the entities or vendors. Data-driven comparisons may be supported with optional user ratings. Users of the tree-based vendor comparison system can benefit from the knowledge imparted on the system from prior users.

Users answering, or issuing, specific queries over time can support gradually building a matrix of data that becomes more and more complete. According to one example, if a user with a gluten allergy eats a friend chicken dish, they may be asked if the dish was gluten free. Similarly, they may ask the question directly. Either way, the answer may then be known for all future users.

While the capability tree structure 210, or that for a given domain, may be managed and maintained as a master tree by a data steward, each user may be able to specify which parts of that tree they want to work with to compare options. For example, if one user is comparing print vendors, they may only care to search over vendors offering color printing. A user may not wish to see the black and white printing options or insert options in their comparison of vendors. A user can suggest changes to the structure or content of the capability tree structure 210. The user input may be included immediately, or the input may also be offered as a suggestion to a data steward. The data steward can then choose to accept the suggestions, a modified version of the suggestions, or they may not accept the suggestions at all.

The tree-based vendor comparison system can support searching for capabilities. Examples of capabilities may be full service versus take-out in a restaurant, or used car versus new car dealerships.

Users may start a hierarchy of interest and search for a set of capabilities that descend in order and become more specific deeper into a search. Capabilities may be given one at a time, giving weights to how important they may be to a user. Initially, coming up with a set of tools that meet these functionalities in broad terms may be used. Capabilities may be searched according to combinations of multiple tools. Tools may be defined as multiple sub-options within vendors that are used in combination with each other.

The tree-based vendor comparison system can support creating a new type of tool to improve the ability to understand existing needs of clients. New keywords and text can be entered into the system to create new tools. Functions or algorithms that calculate ranges, limits, and other associated specifications as defined by a user can be entered into a search or query. This can trigger specific data to be calculated for a user.

Tools can be in a specific domain. The tool may be assembled as a set of selected criteria to search. Capabilities need not to be tied to only one type of tool, as there may be a high-level capability hierarchy. There may also be multiple hierarchies with versioning functionality. Users can create new capabilities and associate them in the functionality hierarchy and then add those to the tool.

Users may leverage the tool to select functionalities to search and/or compare in the capability tree structure 210. Parameters and limits may be set within the tree. For example, a user may search for a vendor that sells salmon and also opens at, or before, 8:00 AM.

The tree-based vendor comparison system can support managing a capability hierarchy. Users can propose changes and can vote amongst each other whether to make the change, as well as up-vote or down-vote other users' ratings in order to give them higher or lower priority. Users can also create their own branch of the hierarchy for their own purposes, as a custom hierarchy.

The tree-based vendor comparison system can support user ratings for various vendor capabilities. There may be a text box wherein users can describe their experience with specific vendors. They may write reviews and give a score based on certain criteria such as overall customer service, quality of goods and/or services, pricing, and so forth.

The tree-based vendor comparison system can support contacting a vendor's sales representative. For example, if the vendor's contact information is available on the website and/or application the user may contact the vendor with any questions about products, pricing, shipping times, specials the vendor may be promoting, and so forth.

The tree-based vendor comparison system can support charging vendors for leads recommending their tools in the system. If the user can log in for free, the system may charge the vendor to display their solution to the user.

The tree-based vendor comparison system can support charging users for its service. If the user pays a subscription then they may see all vendors, even if the vendor did not pay for advertising.

The tree-based vendor comparison system can support viewing of individual vendor scores by the user, and users can score vendors themselves depending on their opinion of the vendors' financial records, size of the vendor, earnings, and so forth. Vendor scores may be based on dynamic relative terms of where they are in the standard deviations of other respondents. An algorithm may be used to calculate vendor scores.

The tree-based vendor comparison system can support viewing a cumulative score of stability. For example, vendor stability may be related to a combination of a weighting of importance of the vendor to the user and how well the vendor meets the functionality requirements of the user.

Official company representatives can endorse specific vendors in the system. This feature may allow the vendor representatives to pay a fee for special promotions. An example might be the CIO of a client company giving a top recommendation to a vendor solution. Such a top ranking might only apply to location while not applying to becoming number one in a given field. Generally, becoming number one in a given field might be obtained by merits.

The tree-based vendor comparison system can block specific vendors from rating other vendors. Employees of one vendor may be highlighted or blocked if they rate products from competing vendors, so it may be clear that a competitor is placing the rating, or so such ratings will not exist. This could be done using existing social media, LinkedIn API information, or a similar service interface. Users can vote that rating up or down based on whether they agree with it. Employees of one vendor may be prohibited from voting up or down any scores for products they sell to prevent bigger employers from having an advantage.

The tree-based vendor comparison system can support hierarchy managers. Users may become hierarchy managers by assignment or by votes from others users. The users with the majority of votes may become hierarchy managers.

The tree-based vendor comparison system can support creating alternate hierarchies. Aspiring hierarchy managers can create non-live alternate versions of the hierarchy to demonstrate how they would want to shape the hierarchy. These may be only available to advanced users who may feel that the current hierarchy manager is not meeting various metrics of performance or where there is a need for multiple hierarchies.

The tree-based vendor comparison system can support various vendor types. There may be list of all vendor types currently in the system. During vendor searches, an autocomplete search capability may be used to find a vendor type. If the vendor type does not exist then the user may suggest updates.

The tree-based vendor comparison system can support vendor types. One type of vendor may have a data steward who manages trees associated with this type of vendor and its capabilities.

The tree-based vendor comparison system can support capability comparisons for comparing capabilities for the vendor type across multiple vendors. The tree-based vendor comparison system can support vendor comparisons in order to compare key information about a vendor such as its financials, customer base, and so forth.

The tree-based vendor comparison system can support vendor users. Vendor users may be those that offer products or sets of capabilities in a capability space. The vendor may provide key statistics in the vendor comparison screen for their company and can provide a description of each of their capabilities.

It should be appreciated that while an example of comparing vendor capabilities is used for illustrative purposes herein, the present technology may be used to compare any set of criteria $x_1 \ldots x_n$ to any set of other criteria $y_1 \ldots y_m$. Such comparison may include representing $y_1 \ldots y_m$ along one graphical axis to further compare against another criteria $z_1 \ldots z_k$. Additional such comparisons across additional dimensional axes can be continued as required by the situation.

The tree-based vendor comparison system can support various user permission levels. A user should only see the options that pertain to their permission levels. For example, standard users may be given access the website and/or application to perform capability comparisons. Mavens/Data Stewards may be given access to suggest, add, or rename comparison criteria. Administrators may have access to change data steward rights and act as a data steward for technical areas, or domains, within the website and/or application.

The tree-based vendor comparison system can support industry-specific operations. Users may want a view into a specific industry. For example, ratings for the insurance industry may be different than rating them for consumer packaged goods.

The tree-based vendor comparison system can support filter/sort operations. Tables may be filterable and sortable. For example, entering data by text strings with asterisks may support text with wild cards. A "wild card" in this instance means that the text may appear anywhere in a search or may appear out of context. Automatic wild card functionality may be used before and after the text written, unless quotes are used in the text. If quotes are used in a search then the search may look for the exact text strings contained within the quotes. Additionally, any column name may be sorted alphabetically or numerically.

The tree-based vendor comparison system can support printing and presentations. The system may have the ability to print out a vendor comparison chart to share in business meetings and so forth. The system may have the ability to create a presentation to share with a company's management team, for example, showing the vendor comparison by capability and rating.

The tree-based vendor comparison system may support contract negotiations on the website/application. Clauses that can be included or excluded may be highlighted. Various parties in negotiations may provide price bids or asks. There may be a complete vendor management system. Features of such system may include picking a vendor, signing contracts, managing quality controls, and managing service level agreements ("SLAs").

The tree-based vendor comparison system can support saving changes. All changes may happen in JavaScript libraries. Real-time changes may allow an immediate-responding user interface that can eliminate Internet latency on the website or application. The changes may be saved regularly to the database as time permits. If data goes more than four to five seconds without saving to the database, a message may appear in red at the top of the screen prominently saying, "Changes have not yet been saved, please check your Internet connection." The changes may continue to queue up to be saved until the user connects to the Internet again. If the user tries to close the web browser tab that has unsaved changes, the system may prompt them, "You will lose some of your changes if you close this browser tab, are you sure you want to lose your changes?" The system may implement many-tasking, where, similar to Google Docs, many people can make edits to the same objects at the same time. If a user disconnects from the Internet for more than one minute and they had a record locked, that record may be unlocked.

The tree-based vendor comparison system can support usage statistics. Every piece of data created may be flagged with the user ID of the person who created it and the date on which the data was created. If an object is edited it may store both the old value and the new value. Queries may be viewed to detect usage statistics at any given time with the purpose of seeing who the most active users may be at any given time.

The tree-based vendor comparison system can support various revenue-earning options. Vendors may be charged to appear on the system. Advertisement key words may display advertisements to people who are viewing specific types of vendors, including targeted advertisements obtained by Internet cookies. Vendors may be charged a commission for selling the business through the system.

Interface display for vendor types using capability tree structure 210 may include soups, salads, seafood, pasta, or steaks. Looking at the capability tree structure 210, users, contributors, etc. may create new vendor types. Users, contributors, and so forth may navigate to open a vendor type capability comparison. Users, contributors, and so forth may have access to interface display options for capability comparisons. Options may be to include or exclude vendors, include or exclude criteria, sort vendors by rating or other criteria, set scores for criteria and vendors, display results of vendor comparison tree changes using interaction with the vendor comparison tree screen. Display of results may only be allowed on a capability deep dive; however, there may be an ability to add customer reviews to any capability.

For navigation purposes, users may open the vendor comparison tree, navigate to deep dive on criteria with customer ratings, or navigate to vendor comparison view. Vendor comparison view may allow the user to see which vendors are larger, more stable, and their reputation in general. Users may also be able to suggest criteria to add. The criteria may be queued up for a data steward to accept, reject, modify and/or add to them. Data steward permissions may include the ability to add, rename, or move criteria up, down, or indented, as they see fit. Branches may move together if going up or down, along with all sub-branches within a particular branch being moved up or down. If a data steward indents a branch left or right a pop-up may ask the steward whether he wants to move the entire branch. If the answer is "no" then the selected item may move excluding any sub-branches.

Interface display for vendor information may include the following: Include/exclude vendors; include/exclude criteria; sorting by vendor rating or by individual criteria rating; and setting scores for vendor background information and vendors. The interface display may be able to set scores at the branch/node level. This may apply to all branches/nodes and leaves below that branch/node, or at the individual leaf level.

Vendor permissions may include the ability to suggest criteria to add, queued up for a data steward to accept, reject, modify, and/or add to these criteria. In addition, vendors, along with data stewards may add or rename criteria. Data stewards and vendors may also have the ability to move criteria up, down, or change indentation. Should a data steward indent a branch left or right a pop-up may ask the steward whether he intends to move the entire branch. If the answer is "no" then the selected item may move excluding any sub-branches. Data stewards and vendors may have the ability to navigate back to criteria selection screens, while retaining the filters and/or sorted data chosen on the vendor comparison screen.

The interface display for capability deep dives may include: selecting a customer review that a vendor may recommend to represent a particular capability. This rating may be used rather than the average customer review rating, and customers' text may be displayed on the vendor comparison chart above the rating or capability. The interface display for capability deep dives may also include filtering by ratings above or below a certain number of stars for ratings, specific companies, or people, and the ability to add customer reviews to this capability.

The interface display for editing vendor mavens may include viewing other vendor mavens' proposed trees/ changes, adding other vendor mavens, and removing themselves as vendor mavens. This may apply only for the vendor areas for which they are mavens. Administrators may be able to do everything a vendor maven can do, but for all vendor areas. An interface display for editing vendor contacts may include adding, editing, and removing other vendor contacts (for his or her company only).

If should be appreciated that while a capability tree is used throughout this disclosure as an example, various alternative embodiments may employ a different capability structure without departing from the spirit or scope of the technology presented herein. For example, the capability structure may comprise graphs, graph databases, sets, lists, pointers, grids, arrays, multi-dimensional arrays, hashes, and/or any other framework for structuring data or representing relationships.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 3:
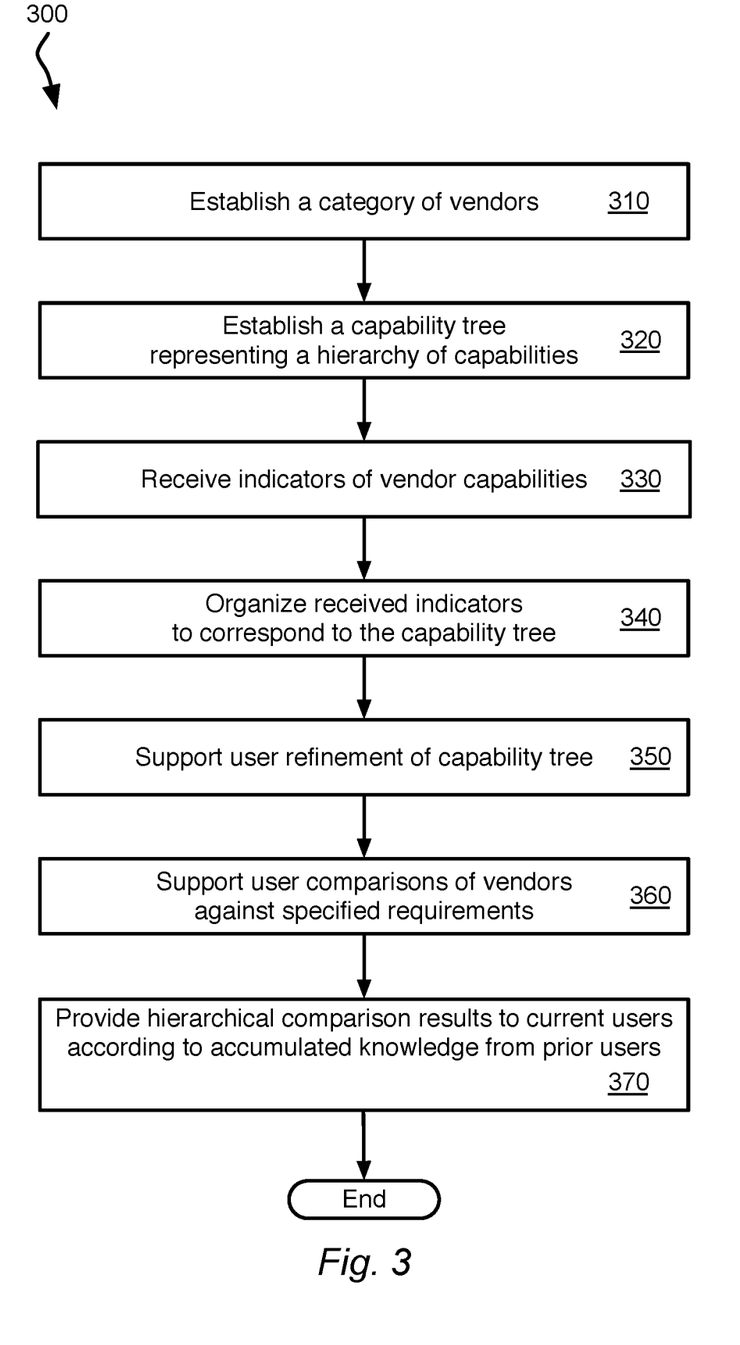
FIG. 3 is a block flow diagram depicting a method for tree-based vendor comparison in accordance with one or more embodiments presented herein.

FIG. 3 is a block flow diagram depicting a method 300 for tree-based vendor comparison in accordance with one or more embodiments presented herein. In block 310, the vendor comparison server 130 can establish a category of vendors. These vendors may be providers who offer goods or services to the customers. Categories of vendors may be specified along various criteria such as industry, sub-category of industry, sector, geographic area, and so forth. For example, a category may be seafood restaurants in the Dallas, Tex. area. The categories of vendors may be specified explicitly by users or sorted and categorized algorithmically.

In block 320, the vendor comparison server 130 can establish a capability tree representing a hierarchy of capabilities. The capabilities and their tree-structure may be specified by one or more users. The capabilities and their tree-structure may be associated with the category of vendors. The capabilities may correspond to goods or services offered to customers.

In block 330, the vendor comparison server 130 can receive indicators of vendor capabilities. The indicators may be whether the vendor supports the capability or not. For example, does a hotel have free parking? The indicators may be a value range, such as operating hours for a retail store. The indicators may be user reviews in the form of scores or testimonials. The indicators may be comparative. For example a user review seafood restaurants in the Dallas area may give one restaurant a score of 90 for shrimp scampi while assigning to another restaurant a score of 85. The indicators may be collected using crowd-sourcing among some or all of the various users. The indictors may comprise various metrics of capability. Any of these metrics may be in the form of scores, ranks, ratings, ranges, values, and so forth.

In block 340, the vendor comparison server 130 can organize received indicators to correspond to the capability tree. For example, ratings given to vendors 220 by various users may be organized into a structure that reflects the capability tree structure 210. It should be appreciated that organizing the indicators may comprise aggregating the crowd-sourced vendor capability indicators. According to certain embodiments, organizing capability indicators into the capability structure may comprise data mining text, data bases, or other information structures for indicators associated with the specified capabilities.

In block 350, the vendor comparison server 130 can support user refinement of capability tree. A user may update or modify the capability tree structure 210 associated with a particular vendor category. Such updates may require approval from another user.

In block 360, the vendor comparison server 130 can support user comparisons of vendors against specified requirements. The specified requirements can indicate which portions of the capability tree structure 210 to compare. For example, compare user scores for oil changes among local service stations. The specified requirements can also indicate values, ranges, or matches to pre-filter capability tree structure 210 against. For example, compare user scores for breakfast among local restaurants that serve pancakes and open before 8 A.M. on Sundays. These comparisons can support users identifying vendors 220 that meet their respective requirements most effectively. When a user searches on a list of attributes, vendors 220 having those attributes and ideally having the best positive ratings around those attributes, may be presented in response.

In block 370, the vendor comparison server 130 can provide hierarchical comparison results to current users according to accumulated knowledge imparted by prior users.

Example Systems

FIG. 4 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, OTT TV, IP TV, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method comprising:
    storing, in a database, a plurality of information about a plurality of restaurants;
    storing, in the database, a plurality of dishes served by the plurality of restaurants and a plurality of operating attributes of the plurality of restaurants, wherein the plurality of dishes includes a plurality of user ratings;
    storing, in the database, a plurality of attributes for each of the plurality of dishes, wherein each of the plurality of attributes includes at least one user rating;
    receiving, by a server communication device, from a querying computing device, a comparison query comprising a specific dish and a desired operating attribute;
    determining, by the server communication device, that at least one restaurant satisfies the comparison query, based on the specific dish, the desired operating attribute, the plurality of dishes of the at least one restaurant, and the plurality of operating attributes of the at least one restaurant; and
    transmitting, by the server communication device, to the querying computing device, information about the at least one restaurant.

2. The computer-implemented method of claim 1, wherein the specific dish is a first specific dish, wherein the comparison query further comprises a second specific dish, and wherein the method further comprises determining the at least one restaurant of the plurality of restaurants that serves the first specific dish and the second specific dish.

3. The computer-implemented method of claim 1, wherein the comparison query further includes a minimum rating for the specific dish, and wherein the method further comprises determining the at least one restaurant based on a user rating of the plurality of user ratings of the specific dish exceeding the minimum rating for the specific dish.

4. The computer-implemented method of claim 1 further comprising:
   receiving, from a plurality of user computer devices, a plurality of user provided ratings for the plurality of dishes for the plurality of restaurants; and
   updating, in the database, the plurality of user ratings for the plurality of dishes offered by the plurality of restaurants based on the plurality of user provided ratings.

5. The computer-implemented method of claim 4, wherein the plurality of user provided ratings include a plurality of sub-ratings for the plurality of attributes of the plurality of dishes at the plurality of restaurants, and wherein the method further comprises updating, in the database, the plurality of ratings for the plurality of attributes of the plurality of dishes offered by the plurality of restaurants based on the plurality of user provided ratings for the plurality of sub-ratings.

6. The computer-implemented method of claim 1, wherein the plurality of attributes of the plurality of dishes includes one or more ingredients of the corresponding dish.

7. The computer-implemented method of claim 1, wherein the plurality of operating attributes includes at least one of parking availability, operation hours, value range, or location.

8. The computer-implemented method of claim 1, wherein the determining includes the at least one restaurant comprises a first restaurant that includes the specific dish and a second restaurant that does not include the specific dish.

9. The computer-implemented method of claim 1, further comprising:
   selecting, by the server communication device, a customer review of a restaurant of the plurality of restaurants to represent a particular dish of the plurality of dishes; and
   updating, by the server communication device, one or more ratings of the plurality of dishes based on the customer review.

10. A restaurant comparison system comprising one or more processing units, and one or more processing modules, wherein the restaurant comparison system is configured by the one or more processing modules to:
    store, in a database, a plurality of information about a plurality of restaurants;
    store, in the database, a plurality of dishes served by the plurality of restaurants and a plurality of operating attributes of the plurality of restaurants, wherein the plurality of dishes includes a plurality of user ratings;
    store, in the database, a plurality of attributes for each of the plurality of dishes, wherein each of the plurality of attributes includes at least one user rating;
    receive, from a querying device, a comparison query comprising a specific dish and a desired operating attribute;
    determine that at least one restaurant satisfies the comparison query, based on the specific dish, the desired operating attribute, the plurality of dishes of the at least one restaurant, and the plurality of operating attributes of the at least one restaurant; and
    transmit, to the querying device, information about the at least one restaurant.

11. The restaurant comparison system of claim 10, wherein the specific dish is a first specific dish, wherein the comparison query further comprises a second specific dish, and wherein the method further comprises determining the at least one restaurant of the plurality of restaurants that serves the first specific dish and the second specific dish.

12. The restaurant comparison system of claim 10, wherein the comparison query further includes a minimum rating for the specific dish, and wherein the restaurant comparison system is further configured by the one or more processing modules to
    determine the at least one restaurant based on a user rating of the plurality of user ratings of the specific dish exceeding the minimum rating for the specific dish.

13. The restaurant comparison system of claim 10, wherein the restaurant comparison system is further configured by the one or more processing modules to:
    receive, from a plurality of user computer devices, a plurality of user provided ratings for the plurality of dishes for the plurality of restaurants; and
    update, in the database, the plurality of user ratings for the plurality of dishes offered by the plurality of restaurants based on the plurality of user provided ratings.

14. The restaurant comparison system of claim 13, wherein the plurality of user provided ratings include a plurality of sub-ratings for the plurality of attributes of the plurality of dishes at the plurality of restaurants, and wherein the restaurant comparison system is further configured by the one or more processing modules to update, in the database, the plurality of user ratings for the plurality of sub attributes of the plurality of dishes offered by the plurality of restaurants based on the plurality of user provided ratings for the plurality of sub-ratings.

15. The restaurant comparison system of claim 10, wherein the plurality of operating attributes includes at least one of parking availability, operation hours, value range, or location.

16. The restaurant comparison system of claim 10, wherein the determining includes the at least one restaurant comprises a first restaurant that includes the specific dish and a second restaurant that does not include the specific dish.

17. A computer program product comprising a non-transitory computer-readable storage medium having computer-readable program code embodied therein that, when executed by one or more computing devices, perform a method comprising:
    storing, in a database, a plurality of information about a plurality of restaurants;
    storing, in the database, a plurality of dishes served by the plurality of restaurants and a plurality of operating attributes of the plurality of restaurants, wherein the plurality of dishes includes a plurality of user ratings;
    storing a plurality of attributes for each of the plurality of dishes, wherein each of the plurality of attributes includes at least one user rating;
    receiving, from a querying device, a comparison query comprising a specific dish and a desired operating attribute;
    determining that at least one restaurant satisfies the comparison query, based on the specific dish, the desired operating attribute, the plurality of dish of the at least one restaurant, and the plurality of operating attributes of the at least one restaurant; and
    transmitting, to the querying device, information about the at least one restaurant.

18. The non-transitory computer-readable storage medium in accordance with claim 17, wherein the specific dish is a first specific dish, wherein the comparison query further comprises a second specific dish, and wherein the method further comprises determining the at least one restaurant of the plurality of restaurants that serves the first specific dish and the second specific dish.

19. The computer-implemented method of claim 1 further comprising generating a recommendation for at least one restaurant of the plurality of restaurants based on the plurality of user ratings associated with one or more desired capabilities.

\* \* \* \* \*